3,184,283
PROCESS FOR APPLYING FIBER-REACTIVE DYES
TO CELLULOSIC MATERIALS
John Elton Cole, Jr., and William Henry Gumprecht, Wilmington, Del., assignors to E. I. du Pont de Nemours and Company, Wilmington, Del., a corporation of Delaware
No Drawing. Filed Jan. 14, 1963, Ser. No. 251,042
6 Claims. (Cl. 8—54.2)

This application is a continuation-in-part of our co-pending application Serial No. 154,028, filed November 21, 1961.

The present invention is directed to a novel continuous dyeing process for the application of quinoxaline fiber-reactive dyes to cellulosic materials wherein the fabric is padded, dried, alkali treated and cured by steaming. This novel process gives significantly uniform results for all reactive dyes prepared from 2,3-dichloro-6-quinoxalinecarbonyl chloride.

The inventors faced the problem of providing a method for applying, to cellulosic materials, fiber-reactive dyes prepared from 2,3-dichloro-6-quinoxalinecarbonyl chloride. Such a method must be compatible with all dyes prepared from this "hook" and achieve the significant results herein described and claimed.

With fiber-reactive dyes, it is a well known fact that time, temperature and acid acceptor are the three variables which are important for reaction with the cellulose textile materials. Although it is possible with all fiber-reactive dyes to get some dye-fiber reaction by varying these variables over an extremely wide range, it is well known that the reactivity among the various reactive dye types, and even among the dyes of the same type, cannot be predicted. Thus, if possible, it is necessary and of advantage to determine for each type of reactive dye a unique method of dyeing, which is compatible with all of the dyes of that type.

In other words, since it is impossible to predict dyeing characteristics from chemical composition, one must discover the unique and novel dyeing method for each reactive dye type.

It is, therefore, an object of the present invention to provide, for the first time, a novel continuous dyeing process for the two-bath dyeing application of a most recent type of fiber-reactive dyes, those prepared from 2,3-dichloro-6-quinooxalinecarbonyl chloride.

It is a further object of this invention to provide a novel process for obtaining significant dyeings in high fixation yields, said dyeings reflecting good wash-fastness properties, resistance to acid perspiration and fully acceptable light-fastness properties. In general, the novel two-bath dyeing method of this invention is compatible for application of all the herein defined quinoxaline dyes by continuous methods where speed is important.

These and other objects of this invention will become apparent in the following description and claims.

The novel continuous process of dyeing embodied by this invention is characterized by padding the dye solution onto the fabric, drying, treating with an acid acceptor solution and steaming. More specifically, the present invention comprises the following combination of steps:

(a) The cellulosic material is padded with an aqueous solution of said dichloroquinoxaline dyes maintained at a pH of 6 to 7.8; as an alternate embodiment of this invention, printing of said material may be achieved from an engraved roller with an essentially neutral paste of said dyes;

(b) The padded material or printed material is then dried, for example, in a flue dryer;

(c) The drying step is followed by treating the resultant material with an aqueous alkaline liquor containing alkali which is weaker than 5 grams/liter of sodium hydroxide and stronger than sodium bicarbonate, said liquor containing from 200 to 300 grams/liter of sodium sulfate;

(d) The next step is one of curing by steaming;

(e) The curing step is then followed by washing steps normally utilized by one skilled in the art for removal of unfixed dye.

The curing step in the present inventive process is carried out by steaming for a period from 12 to 30 seconds at 210 to 230° F., with padding, and at a temperature of 210 to 270° F. with prints; the former method is referred to as pad-steam dyeing and the latter method as flashage printing.

A technically significant feature of the inventive process is that after following the first three steps hereinbefore described, steam curing conditions can be utilized, thus permitting the maximum utilization of commercially available equipment.

Another feature of this invention is that all of the dyes prepared from 2,3-dichloro-6-quinoxalinecarbonyl chloride can be applied without sacrificing any of the desired application properties of one specific dye. These dyes and their preparation are fully disclosed in our co-pending application heretofore identified.

Prior to the herein described novel process for dyeing cellulosic materials, one would have used stronger alkali to assure rapid and complete fixation in the pad-steam and flash ageing methods, as generally required for continuous application of fiber reactive dyes. However, we have found that if stronger alkali than defined above is used in a pad-steam application of certain dyes of the quinoxaline type, there results a dyeing with less acid perspiration fastness, less acid storage stability, and lower fixation. We also found that pad-steam application of the dichloro-6-quinoxalinecarbonylaminoanthraquinone type colors using weaker alkali than defined herein gives inferior color value and requires longer steaming times. In other words, for the present two-bath application method, the defined acid acceptor range is critical with respect to the dichloroquinoxaline dye type.

It should be mentioned that the salt and its concentration are critical in the practice of this invention if one is to take advantage of this process. Lower amounts than defined will permit bleeding of dye during the aqueous alkaline treatment, which results in "tailing." Sodium sulfate is the preferred salt since it gives greater color value than sodium chloride in the process of this invention.

At the present time, the most used continuous two-bath application methods are pad-steam and flash ageing, since the required equipment is used for the application of other classes of dyes, for example vat dyes.

It is to be understood by those skilled in the art that additives, for example, surface-acitve agents, migration inhibitors, solubilizing agents and inert thickening agents are sometimes used in the practice of this invention when dyeing or printing.

The most common additives are: "Sitol"—sodium m-nitrobenzene sulfonate; "Keltex"—sodium salt of alginic acid (Kelco Co., Clark, N.J.); "Superclear" Gum—refined solution of natural gums (1962 AATCC Yearbook, p. E–145) (Jaques Wolf and Co., Newark, N.J.); "Cassofix AS"—benzol derivative and resin precondensate (1962 AATCC Yearbook, p. E–205) (Sou-Tex Chemical Co., Inc., Mount Holly, N.C.). Additives should not react with dyes in an undesirable manner.

Representative examples illustrating the present invention follow.

Example 1

Forty parts of the quinoxaline dye of the following structure

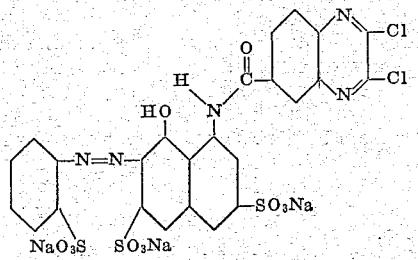

are dissolved in 1000 parts of water. This solution is padded onto cotton poplin at a 65% pick-up, after which the fabric is dried in a flue dryer. This dried fabric is padded at 65% pick-up with a solution of 15 g./l. of sodium carbonate and 275 g./l. of sodium sulfate, and passed immediately through a steam chamber at 215° F. for 20 seconds. After this step the fabric is washed (hot water rinse, cold water rinse, hot soap scour, hot water rinse, in turn) and dried; there results a bright red shade which is fast to washing and light.

Example 2

Twenty parts of the quinoxaline dye of the structure

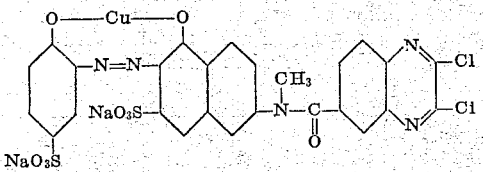

are dissolved at pH 7.3 in 1000 parts of water containing 25 parts of "Cassofix AS." This solution is padded onto cotton broadcloth at an 80% pick-up; after which the fabric is dried, repadded with a solution of 3 g./l. of sodium hydroxide and 300 g./l. of sodium sulfate and passed through a steam chamber at 220° F. for 12 seconds. After the fabric is washed and dried as in Example 1, there results a ruby shade which is fast to washing and light.

Example 3

Thirty parts of the quinoxaline dye of the structure

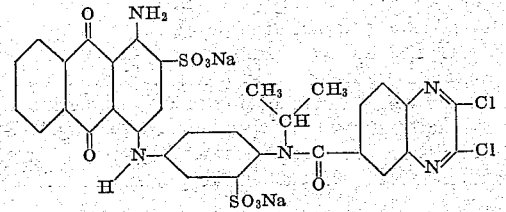

are dissolved at pH 6.2 in 1000 parts of water. This solution is padded onto cotton poplin at 70% pick-up and the fabric is dried, repadded with an aqueous solution containing 5 g./l. of sodium hydroxide and 200 g./l. sodium sulfate and steamed at 212° F. for 30 seconds. After washing as in Example 1 there results a strong bright blue dyeing with good wash and light fastness.

With five parts of the quinoxaline dye of Example 1 are added to the dye solution in this example, there results a violet shade with good fastness properties.

Example 4

Sixty parts of the quinoxaline dye of the structure

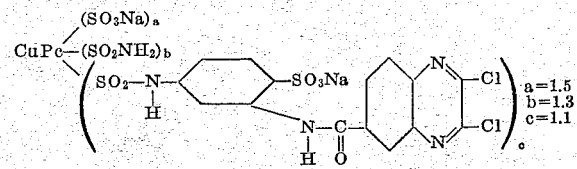

are dissolved in 1000 parts of water. This solution is padded onto cotton twill. The fabric is dried in a flue dryer, padded with an aqueous solution of 12 g./l. of sodium carbonate and 300 g./l. of sodium sulfate, steamed at 217° F. for 25 seconds and washed as in Example 1. There results a strong turquoise dyeing with good wash and light fastness.

When the alkali-salt solution of this or the other examples is sprayed rather than padded onto the dried fabric there results dyeings of equal shade strength and fastness properties.

Example 5

A printing paste is prepared by adding 50 parts of "Keltex" to a solution of three parts of the dye

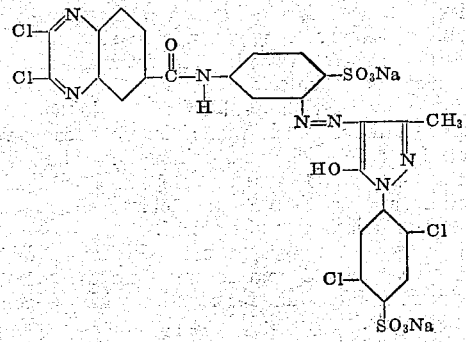

2.5 parts of "Sitol" and 38.5 parts of water. After printing onto cotton broadcloth, the fabric is dried in a flue dryer and padded with an aqueous solution containing 5 g./l. of sodium hydroxide and 300 g./l. of sodium sulfate. This wet fabric is squeezed to 200% of its dry weight, steamed at 240° F. for 23 seconds and washed as in Example 1. There results a bright yellow dischargeable print which is fast to washing and light.

Example 6

A printing paste is prepared by adding 50 parts of sodium carboxymethylcellulose (sodium CMC) to a solution of nine parts of the dye

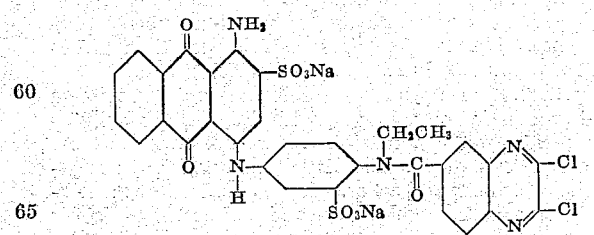

four parts of "Sitol," and 37 parts of water. After printing onto cotton poplin the fabric is dried, padded with an aqueous solution containing 15 g./l. of sodium carbonate, 1 g./l. of sodium hydroxide and 250 g./l. of sodium sulfate, steamed for 15 seconds at 260° F. and washed as in Example 1. There results bright heavy blue prints with good wash and light fastness.

Starch ether gums are equally effective when used in the above formulation in place of the sodium CMC.

Likewise, when steaming temperatures of 212–220° F. are used equally bright prints are obtained.

When the dyes used in Examples 2 and 4 are employed in the printing formulation of Examples 5 and 6 there results ruby and turquoise prints, respectively.

The fiber-reactive dyes which may be utilized in the practice of this invention are those which contain a 2,3-dichloro-6-quinoxalinecarbonylamino group, and are disclosed in our copending application heretofore identified and include fiber-reactive dyes of the formula

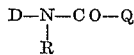

wherein D is the radical of a water-soluble anionic dye chromophore, R is selected from the group consisting of hydrogen, lower alkyl, 2-hydroxyethyl, 2-cyanoethyl and 2-sulfatoethyl and Q is the 2,3-dichloro-6-quinoxalinyl radical.

The quinoxaline dye employed in the dyeing process of Example 4 is prepared as follows:

To 160 parts of chlorosulfonic acid cooled at 5° C. are added 23 parts of copper phthalocyanine at such a rate as not to exceed 25° C. This slurry is stirred 15 minutes, heated over 1.5 hours to 135±5° C., and stirred at this temperature for 3.5 hours. The dark green solution is cooled to room temperature, and is drowned in a mixture of ice and water at a temperature below 5° C. The solid, which is collected by filtration and washed with 5° C. aqueous 1% hydrochloric acid solution, corresponds to a mixture of compounds of the structure

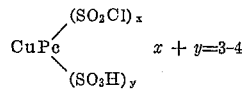

in which all substituents modified by $x$ and $y$ are primarily located in the 3, 3′, 3″ and 3‴ positions. To this sulfonyl chloride filter cake, slurried in 1200 parts of ice water, are added 22.5 parts of 2,4-diaminobenzenesulfonic acid and enough 10 N sodium hydroxide to give a pH of 5.

The pH is raised to 9.0 with ammonium hydroxide, and the temperature is raised to 25° to 30° C. The reaction mass is stirred at this temperature until the pH remains at 8.8–9.2 without further addition of ammonia (about 15 hours). The solution is acidified with hydrochloric acid to precipitate a dye base mixture of the following structure:

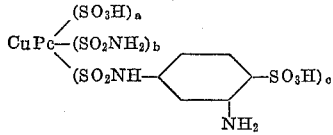

This dye base is filtered, washed free of excess diamine with hydrochloric acid solution, and reslurried in 1500 parts of water at 35° to 40° C. This dye base suspension is neutralized to pH 7.2 with sodium hydroxide, after which 21 parts of finely powdered 2,3-dichloro-6-quinoxalinecarbonyl chloride are added. After rapidly stirring for 8 hours at 35° C. to 40° C. and pH 7–7.5 (maintained with sodium hydroxide) the pH remains constant. The resulting turquoise solution is clarified by filtration and carefully salted to 18% with sodium chloride (18 parts NaCl per 82 parts water). The quinoxaline dye corresponding to the structure shown in Example 4 is filtered off, washed free of a tan color with 20% sodium chloride solution and dried below 60° C. in a vacuum oven.

On analysis, the turquoise dye so obtained is found to contain 1.1 dichloroquinoxaline radicals, 1.3 sulfamoyl radicals, and 2.6 sodium sulfonate groups. Thus, the values for $a$, $b$, and $c$ are 1.5, 1.3, and 1.1, respectively.

Dye mixtures of similar shade, light and wet fastness are obtained when one uses in place of 2,4-diaminobenzenesulfonic acid an equal molar portion of 2,5-diaminobenzenesulfonic acid, 2-chloro-p-phenylenediamine, or 5-amino-2-ethylaminobenzenesulfonic acid, or mixtures of the aryldiamines.

Dye mixtures of similar properties but of slightly greener and duller shades are obtained when one substitutes in place of copper phthalocyanine equal molar amounts of nickel or cobalt phthalocyanine.

The preceding representative examples may be varied within the scope of the present total specification disclosure, and the disclosure of our copending application heretofore identified, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined as follows.

The embodiments of the invention in which an exclusive property or privilege is claimed are defined as follows:

1. A continuous process for dyeing cellulosic materials with a fiber-reactive dye containing a 2,3-dichloro-6-quinoxalinecarbonylamino group, said process being one wherein cellulosic material is (1) padded at a pH of from 6 to 7.8 with an aqueous solution of said fiber-reactive dye, (2) the padded material then being dried followed by (3) treating the dried material with an aqueous alkaline liquor, the alkali of said liquor being weaker than 5 grams per liter of sodium hydroxide and stronger than sodium bicarbonate, said liquor containing from 200 to 300 grams per liter of sodium sulfate followed by (4) steaming the resulting material from (3) and then (5) washing the resulting material of step (4).

2. A continuous process according to claim 1 wherein the steaming step (4) is conducted for 12 to 30 seconds at a temperature of from 210° to 230° F.

3. Process of claim 2 wherein step (3) is limited to "padding" (instead of "treating").

4. A process for printing cellulosic materials with a fiber-reactive dye containing a 2,3-dichloro-6-quinoxalinecarbonylamino group, said process being one wherein celluosic material is (1) printed with a printing paste at a pH of from 6 to 7.8 which contains said fiber-reactive dye, (2) the printed material then being dried followed by (3) treating the dried material with an alkaline liquor, the alkali of said liquor being weaker than 5 grams per liter of sodium hydroxide and stronger than sodium bicarbonate, said liquor containing from 200 to 300 grams per liter of sodium sulfate followed by (4) flash-ageing the resulting material from (3) and then (5) washing the resulting material of step (4).

5. A process according to claim 4 wherein the flash-ageing step (4) is conducted for 12 to 30 seconds at a temperature of from 210° to 270° F.

6. A process according to claim 4 wherein said printing paste is applied to said cellulosic material from an engraved cylinder.

References Cited by the Examiner

UNITED STATES PATENTS 1,886,480  11/32  Haller et al. _____ 260—153

FOREIGN PATENTS 315,451  7/29  Great Britain.
831,371  3/60  Great Britain.
1,247,660  10/60  France.

NORMAN G. TORCHIN, *Primary Examiner.*